April 27, 1954 O. W. OERMAN 2,676,525
POWER LIFT MECHANISM FOR TWO-WAY PLOWS
Filed Aug. 15, 1949 4 Sheets-Sheet 1

FIG. 1

INVENTOR.
OREY W. OERMAN
BY
ATTORNEYS

April 27, 1954     O. W. OERMAN     2,676,525
POWER LIFT MECHANISM FOR TWO-WAY PLOWS
Filed Aug. 15, 1949     4 Sheets-Sheet 3

*INVENTOR.*
OREY W. OERMAN
ATTORNEYS

Patented Apr. 27, 1954

2,676,525

UNITED STATES PATENT OFFICE 2,676,525

POWER LIFT MECHANISM FOR TWO-WAY PLOWS

Orey W. Oerman, Moline, Ill., assignor to Deere & Company, Moline, Ill., a corporation of Illinois Application August 15, 1949, Serial No. 110,325

20 Claims. (Cl. 97—29)

The present invention relates generally to agricultural implements and more particularly to two-way plows which are especially adapted for use where it is desired to turn all of the furrows in the same direction.

The object and general nature of the present invention is the provision of a new and improved raising and lowering means especially adapted for two-way plows and other implements, wherein a single ram unit is utilized to raise and lower the plow units of a two-way plow in the desired sequence. More particularly, it is a feature of this invention to provide raising and lowering mechanism so constructed and arranged that operation of a single power unit, such as a double-acting ram or the like, may be utilized for raising either or both of the plow units and lowering them alternately into operating position.

These and other objects and advantages of the present invention will be apparent to those skilled in the art after a consideration of the following detailed description, taken in conjunction with the accompanying drawings in which a preferred form of the invention has been illustrated.

Figure 1:
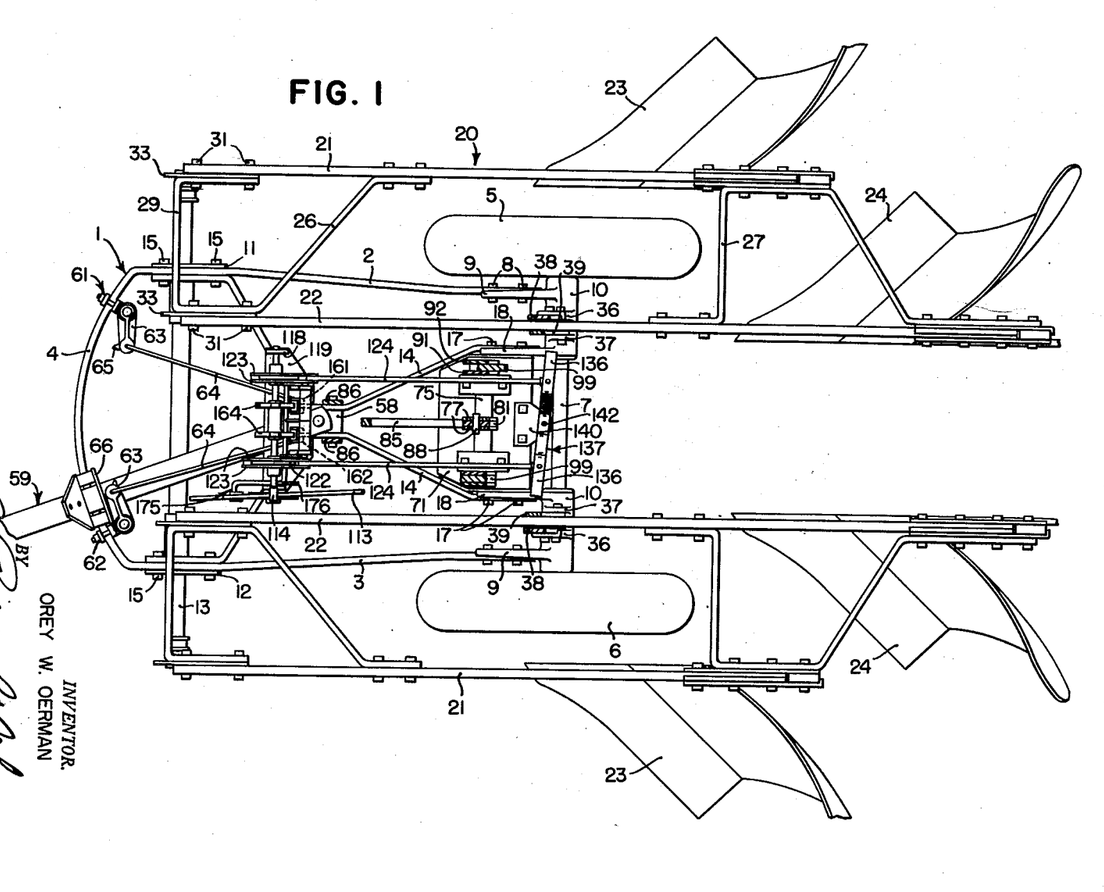
Figure 1 is a plan view of a two-way plow in which the principles of the present invention have been incorporated, certain parts being broken away in order to illustrate more clearly certain of the features of the present invention.
Figure 2:
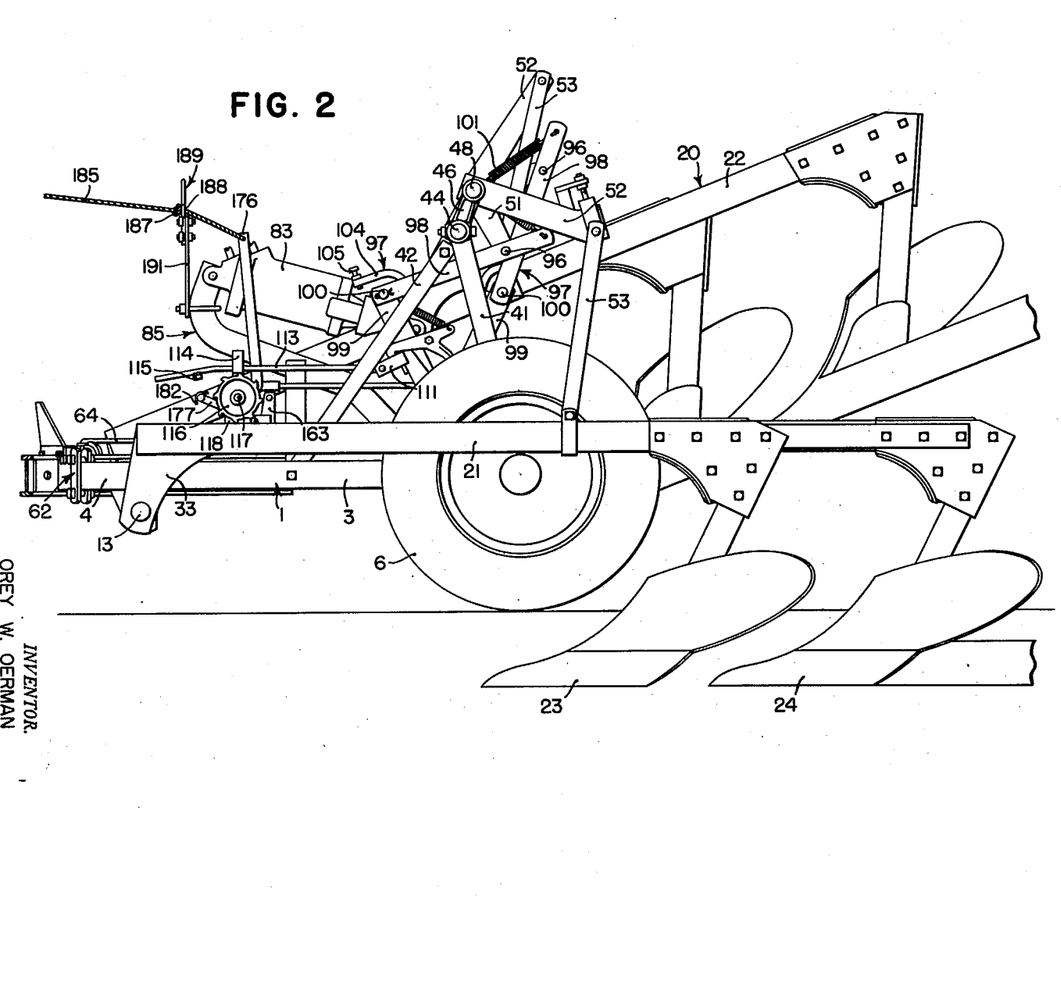
Figure 2 is a side view of the two-way plow shown in Figure 1.

Referring now more particularly to Figures 1 and 2, the reference numeral 1 indicates in its entirety the frame of the two-way plow which includes generally longitudinally extending frame bars 2 and 3 connected together at their forward ends by a curved or arcuate section 4 and supported at their rear portions on a pair of ground wheels 5 and 6 which are fixed respectively to opposite ends of a live axle 7 which passes through journal or bearing members 10. The rear ends of the frame bars 2 and 3 are connected by bolts 8 to generally forwardly extending outer lugs 9 that are carried by or form a part of the pair of axle-receiving members 10. A pair of brackets 11 and 12 are fixed to the forward portions of the frame bars 2 and 3 and are apertured at their lower portions to receive a transverse bar or shaft 13 which extends laterally outwardly at opposite sides of the frame 1. The latter also includes generally V-shaped braces 14 arranged with their apex portions disposed generally laterally inwardly. The forward ends of the braces 14 are bolted, as at 15, to the forward portions of the bars 2 and 3, preferably by the same bolts that secure the brackets 11 and 12 to the frame 1. The rear ends of the brace members 14 are connected by bolts 17 to forwardly extending inner lugs 18 carried by the laterally inner portions of the axle-housing-receiving frame members 10.

Right- and left-hand plow units are pivotally connected to the crossbar or shaft 13 and these units are substantially identical, except that one is a right-hand unit and the other is a left-hand unit. Hence, detailed description of one plow unit will suffice. The right-hand plow unit is indicated in its entirety by the reference numeral 20 and comprises a pair of plow beams 21 and 22 carrying a pair of right-hand plow bottoms 23 and 24. The beams 21 and 22 are reenforced and braced by suitable members 26 and 27, and the forward ends of the plow beams 21 and 22 are interconnected by a U-shaped member 29 which is secured by bolts 31 to the ends of the beams 21 and 22. The bolts 31 also serve to secure a pair of brackets 33 which extend downwardly and are apertured to receive a right end portion of the cross shaft 13. Preferably, the inner bracket 33 is disposed inside the right-hand frame bar 2 and collars or the like on the shaft 13 hold the front end of the plow beam structure 2, 3 against lateral displacement relative to the frame 1. Also secured to the axle-receiving journal members 10 are upwardly extending lugs 36 and 37 to which the upwardly extending, laterally spaced vertical bars 38 and 39 are connected at their lower ends. Each bar 38 is augmented by a diagonally, upwardly and outwardly extending bar 41 and by a downwardly and forwardly extending brace bar 42 which, at its lower end, is secured, as by a bolt 43, to the associated frame bar 2 or 3. There is a set of bars 38, 39 and 41 at each side of the implement and the upper ends of these bars are fixed, as by welding, to a transverse shaft or bar 44 which serves as a part of the lifting frame section of the plow frame. A pair of upwardly extending brackets 46 and 47 are fixed at their lower portions to the crossbar 44 of the lifting frame section. Each of these pairs of brackets rockably receives a transverse shaft member 48. An actuating arm 51 is fixed to the inner end of each of the cross shafts 48 and a lifting arm 52 is fixed to the outer end of each of the cross shafts 48. The outer end of each lifting arm 52 is connected by means of a bail 53 to the beams of the associated plow unit. Preferably, the upper end of the bail 53 is pivoted to the associated arm 52 and the lower portions of each bail 53 are pivotally connected to the beams of the associated plow unit, whereby when the lifting arm or arms 52 are raised the associated plow unit or units are lifted into a transport position.

A block 58 is fixed by bolts or the like to the adjacent apex portions of the brace members 14, and a hitch member 59 is connected to the block 58 by a pivot providing for lateral movement of the hitch member 59 relative to the frame 1. Mounted at each side of the frame 1 on the curved section 4 is a pair of latch units 61 and 62, each of which includes a dog 63 controlled by a link 64 and having a hook portion 65 which is adapted to engage a member 66 carried by the draft bar 59 whereby the latter may, under the control of the latches 61 and 62, be fixed in either of two operating positions, one in which the front end of the draft member 59 is substantially directly ahead of one of the plow units and the other position being one in which the front end of the draft member 59 is in front of the other plow unit. The mechanism for controlling the latches will be set forth in detail below.

Generally speaking, the structure described above is substantially the same as that shown in my prior Patent 2,385,935, issued October 2, 1945, to which reference may be made if necessary. The two-way plow shown in my prior patent included one or more half-revolution clutches as a part of the mechanism for raising or lowering the plow units into and out of transport and working positions. However, the present invention is concerned primarily with a two-way plow construction especially adapted to be used with double-acting hydraulic cylinders or ram units which are frequently available with the newer tractors for use in controlling implements carried on or propelled by the tractor.

Figure 3:
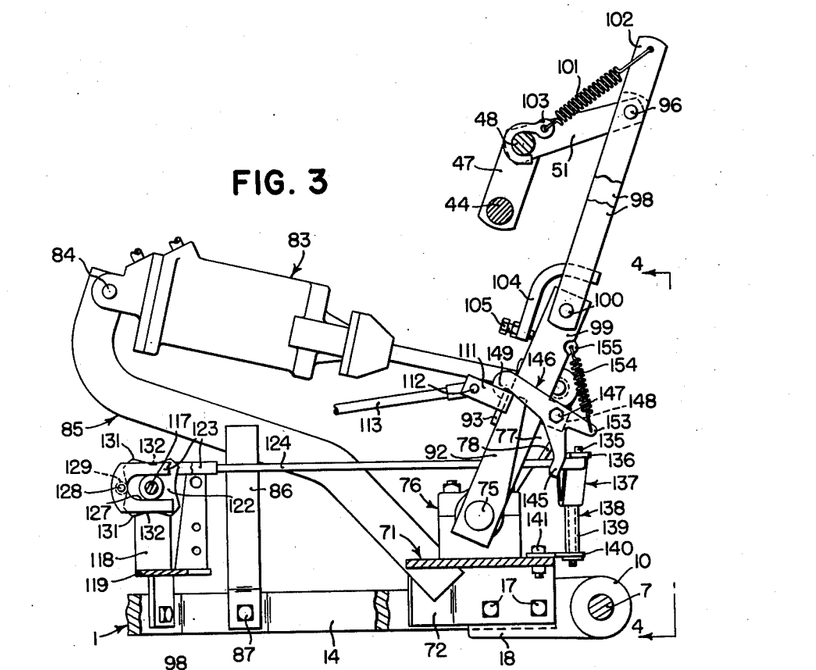
Figure 3 is an enlarged fragmentary side view of the raising and lowering mechanism.
Figure 5:
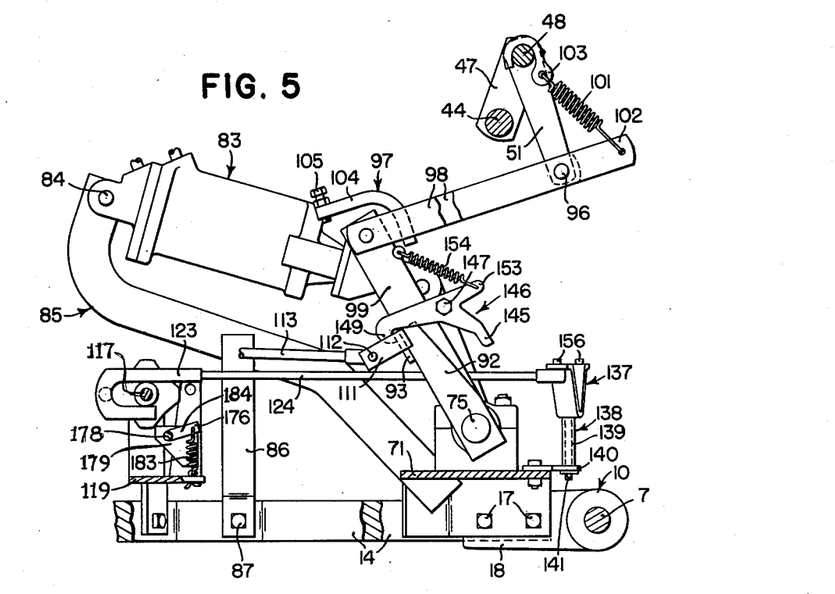
Figure 5 is a side view similar to Figure 3, showing the lift mechanism in the plow lowering position.

Referring now more particularly to Figure 3, I provide a supporting base or plate 71 disposed in a generally transverse position and provided with a pair of laterally spaced flanges 72 apertured to receive the bolts 17 that connect the rear portions of the brace members 14 to the journal members 18. A rockshaft 75 is mounted in a pair of laterally spaced journal boxes 76 carried by the plate 71 and centrally is provided with a pair of closely spaced arms 77 which are tied together at their rear ends by an upper abutment member 78, which is preferably welded to the bars 77. Mounted for rocking movement on the shaft 75 and between the arms 77 is a loosely mounted arm 81 which extends beyond the arms 77 and is provided with a bushing 82 to receive one end of the pivot by which a power cylinder or hydraulic ram unit 83 is connected thereto. The forward end of the ram unit 83 is connected to the forward upper portion 84 of a rigid bracket 85 that is welded at its lower end to the plate 71. The member 85 is suitably reenforced by a pair of braces 86 welded at their upper ends to the bracket 85 and apertured at their lower ends for connection to the frame of the plow, as at 87 (Figures 3 and 5). The upper portions of the arms 77 are apertured to receive an anchoring pin 88 (Figure 1), the upper portion of the center arm 81 also being apertured to receive the pin 88 when the center arm 81 is disposed against the abutment 78. The pin 88 locks the arms 77 and 81 together whereby extension or retraction of the double-acting hydraulic unit 83 serves to swing the arms 77, 81 in one direction or the other, but if the pin 88 should be removed, the center arm 81 may swing forwardly freely from the arms 77. This facilitates attaching and detaching the hydraulic unit 83.

A pair of arms 91, 92 is fixed, as by welding, to each end of the rockshaft 75, and the outer end portions of these arms 91 and 92 are interconnected by a cross piece 93 welded thereto. The arms 91, 92 being fixed to the rockshaft 75, are swung in a generally fore and aft direction whenever extension or retraction of the hydraulic unit 83 acts through the arm 81 and associated parts to rock the shaft 75 in one direction or the other. The shaft 75, together with the arms 77, 81, 91 and 92, and associated members, constitute a part that is movable by the ram unit 83 in one direction for actuating two raising connections associated, respectively, with the two plow frames 21, 22.

The plow unit lifting arms 52, together with the associated cross shafts 48 and operating arms 51, which may be considered bell cranks, are connected to be raised and lowered by operation of the hydraulic unit 83. To this end, the outer portion of each of the arms 51 is apertured to receive a pivot pin 96 by which a pair of toggle links, indicated in their entirety by the reference numeral 97, is connected thereto. Each set of toggle links 97 comprises an upper pair of bars 98 and a lower rigid link 99, pivoted to the lower ends of the links 98 by a a pivot pin 100, the lower end of each of the toggle links 99 being connected for swinging movement on the associated outer end of the cross shaft 75. Each lower toggle link 99 is disposed on the shaft 75 between the associated pairs of rockshaft arms 91, 92, and the associated abutment plate 93 is adapted to be brought into abutment against the forward edge of the associated toggle link 99 whereby further extension of the hydraulic unit 83 serves to swing either or both of the toggle links 99 rearwardly about the shaft 75 as an axis, which motion is transmitted through the associated upper toggle links 98 to the lifting arms 51 and the cross shafts 48. Thus, when either of the plow units is in its lower position, extension of the hydraulic unit 83 will act through the rockshaft 75 and one or the other of the pairs of rockshaft arms 91 and 92 to swing the lower toggle link 99 of the lowered plow unit forwardly, thus raising that plow unit into its transport position.

The parts are so arranged that when the toggle links 98, 99 are shifted by the operation of the hydraulic unit 83 into a position raising the associated plow unit or units, the links 98, 99 move into an overcenter position by a spring 101 which is connected between the upper extended end 102 of one of the links 98 of each pair and an apertured hook member 103 which engages over the shaft 48. An extension 104 is welded to the lower end of each pair of upper links 98 and at its outer end carries an adjusting set screw 105 which cooperates with the associated lower link 99 to determine the overcenter position of the parts, as best shown in Figure 3. The extensions 104 and the set screws 105, together with the associated springs 101, constitute releasable means which acts through the associated toggle links for holding either or both of the plow units in raised position, acting through the associated arms 51 and 52 which constitute raising connections for the plow units. When the toggle links 98, 99 are in their extended or overcenter position, the associated plow units, either one or both of them, are held in a raised position.

According to the principles of the present invention successive operations of the power unit 83 in one direction alternately lowers one plow unit and then the other unit, and successive operations of the power unit 83 in the other direction raises whichever one of the plow units that is in lowered position and conditions the plow whereby the next operation of the power unit 83 results in lowering the other plow unit. The means to that end will now be described.

Figure 4:
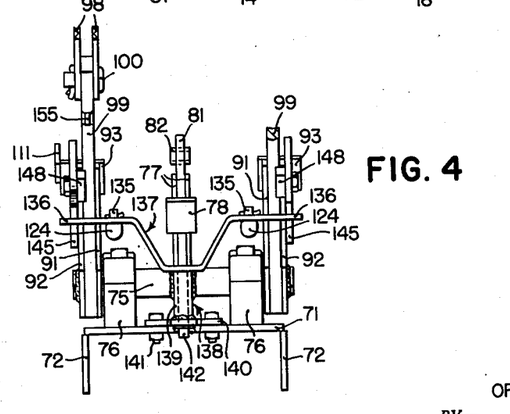
Figure 4 is a view taken generally along the line 4—4 of Figure 3.

A forwardly extending apertured lug 111 (Figures 3-5) is carried by one of the abutment members 93 and receives a pivot pin 112 in which the rear end of a link 113 is received. The forward end of the link 113 extends through a guide strap 114 fixed to the frame 1 and carries a pawl 115 which cooperates with a ratchet sprocket 116 that is fixed to the left end of a cross shaft 117 mounted for rotary movement in a pair of standards 118 fixed to a supporting plate 119 that is mounted on the plow frame 1 generally over the pivot block 58 to which the rear end of the draft member 59 is swingably connected. The lug 111 is disposed in such a position as to move the rod 113 the distance necessary to impart substantially 45° of movement to the ratchet wheel 116. Disposed on the shaft 117 adjacent the standards 118 is a pair of four-lobed cam members 122. Each of these members 122 is disposed between a pair of plates 123 that are fixed to the forward end of a generally fore and aft extending link 124. The plates 123 are slotted, as at 127, to receive the hub of the cam members 122 associated therewith, and the forward portions of the plates 123 are apertured to receive a pin 128 on which a roller 129, disposed between the plates 123, is mounted. The cam 122 is provided with four lobes 131 and four recessed portions 132 between adjacent lobes 131, whereby an advance of the cross shaft 117 through approximately 45° will move the cam wheel 122 from one position to another between the recessed and lobed portions 131 and 132. The cam structure just described is the same at each side of the machine, the cam wheels 122 being mounted on the shaft 117 so that when a lobe portion 131 of one of the cams engages the associated roller 129 on one link 124, the recessed portion 132 of the other cam wheel comes into position adjacent the roller 129 associated with that cam member. The rear ends of the two cam-operated links 124 are provided with pivot members 135 that are connected to the opposite end portions 136 of a rocking member 137 mounted for movement about a vertical axis on a bracket or standard 138. The latter member preferably comprises a sleeve 139 fixed to a plate 140 that is bolted, as at 141, to the plate 71, the central portion of the horizontally rockable member 137 including a depending shaft section 142 which is rockably disposed within the sleeve 139.

Figure 6:
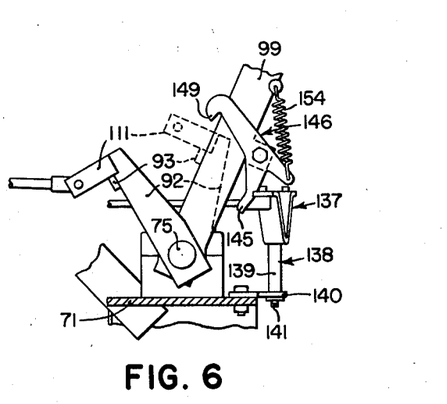
Figure 6 is a detail view similar to Figures 3 and 5, showing one of the toggle latches held in a position releasing the power unit whereby the toggle links are held in their extended position.

Each end 136 of the rockable member 137 is positioned to bear against an arm portion 145 formed on a latch member 146 that is mounted by means of a pivot member 147 on a rearwardly extending lug 148 on the associated toggle link 99. The forward end of the latch member 146 includes a nose or hook portion 149 which is adapted to engage over the upper edge of the associated abutment plate 93 on the power-operated rockshaft arms 91, 92. Each of the toggle links 99 carries a latch 146 as just described, and each latch also includes an extension 153 which is apertured to receive the lower end of a spring 154, the upper end of which is connected to an apertured extended boss 155 on the associated toggle link 99. It will be seen that when the rockable member 137 is disposed in one position, one arm 136 of the member 137 is disposed in its forwardmost position and in that position engages the abutment section 145 on the associated latch member 146, as best shown in Figure 6, holding the nose portion 149 of the latter member out of a position in which it can engage the abutment plate 93 on the associated power-actuated arm, so long as the links 98, 99 are in their overcenter position. The latch 146 on the other link member 95, not being restrained by the associated end of the rockable member 137, is free to move into engagement with the plate 93 and thus serves as means for locking the toggle link 99 to the power-actuated arms 91, 92 at that side of the plow, whereby when the power unit 83 is retracted and the arms 91, 92 swung forwardly, such forward movement will act through the engaged latch member 146 to swing the toggle link 99 forwardly until the links move out of their overcenter position, whereupon the associated plow unit is free to lower as the power-actuated ram 83 continues to retract, the plow unit thus moving downwardly into its operating position. If the latch 146 were not engaged with the abutment plate 93, the forward movement of the power-actuated arm 91, 92 would have no effect on the toggle links 98, 99, which would continue to hold the associated plow unit in a raised position. As the power-actuated arms 91, 92 move forwardly, a forward thrust is exerted through the link 113, which disposes the pawl 115 in a forward position relative to the ratchet wheel 116, whereupon the next actuation of the power cylinder 83 in a rearward direction not only raises the plow unit that was in a lowered position, by virtue of the rearward swinging of the toggle link 99, but also the concomitant rearward movement of the link 113 acts through the pawl 115 to advance the ratchet wheel 116 by a 45° rotation. This movement of the rockshaft 117 reverses the relation of the right- and left-hand cam members 122 and thus results in reversing the position of the latch-controlling member 137, whereupon the latch member 146 that was formerly held in an engaging position is now held in a position in which it is out of engagement with the associated plate 93 while the other latch unit is freed for movement into a position engaging the associated plate 93. Thus, the plow unit that was in lowered position is raised into a transport position, alongside the other plow unit which was held in raised position, and at the same time the rockable member 137 is reversed so as to reverse the latches 146 so that the next movement of the power-operated unit 83 lowers the other bottom, releasing the latch associated with the toggle link for the first mentioned plow unit, whereby the next operation of the ram unit 83 will not lower that plow unit, but, instead, will lower the other plow unit. The latches 146 and associated operating mechanism constitute alternately operable means for optionally releasing the associated holding toggle links 98 and 99 under the control of the plates 93 that form a portion of the power-operated part that is adapted to be moved, as into the position shown in Figure 3, for extending the toggle links and raising either or both of the plow units. When either latch 146 holds the associated toggle link 99 connected with the plate 93, as shown in Figure 5, the associated plow unit is held or locked in its lowered position by the power unit 83 which, when one of the plow units is lowered, is held hydraulically in its retracted position (Figure 5).

The successive actuations of the ratchet wheel 116 and associated cross shaft 117 by 45° increments are made use of for controlling the latches for the laterally swingable drawbar 59. Referring now more particularly to Figure 1, the rods 64 and 65, which extend rearwardly from the hitch-controlling latches 62 and 63, are connected at their rear ends to levers 161 and 162 which are swingably mounted on vertical brackets 163 (Figure 2) on the supporting plate 119 rearwardly of the brackets 118 supporting the shaft 117. Each of the swinging arms 161 and 162 carries a roller, and the rollers are disposed in a position to engage a pair of four-lobed cams 164 fixed to the cam shaft 117 in such positions that the high points of one cam are displaced 45° with respect to the high points on the other cam. In operation, therefore, a rotation of the shaft 117 through 45° results in the high point engaging one of the rollers moving away from that roller and the low point on the other cam moving away from the associated roller on the other swinging arm. This, therefore, reverses the position of the latches which control the hitch or draft member 59. From the previous description above it will be remembered that for every 45° rotation of the cam shaft 117 the raising and lowering mechanism controlling latches are likewise reversed.

Under some conditions it is desirable to be able to raise and lower the same plow unit without causing the latches to reverse, as, for example, when crossing grassed waterways or the like, and in order to arrange the mechanism so that the same plow unit may be raised and lowered without reversing the plow, I provide a disabling device indicated in its entirety by the reference numeral 175. As best shown in Figures 1 and 5, the device 175 comprises a generally upwardly extending arm 176 fixed to an arm 177 (Fig. 2) of a rockshaft 178 (Fig. 5) which is mounted on a pair of brackets 179 carried by the supporting plate 119. The shaft arm 177 extends forwardly and carries a pad 182 which underlies the forward portion of the rod 113. A spring 183 (Figure 5) extends between the plate 119 and an arm 184 on the shaft 178 and exerts a bias holding the end section 177 in an upper position, in which the pawl 115 is held out of engagement with the ratchet, but the lever 176 may be held in a position so as to permit the rod 113 to actuate the ratchet 116 by means which includes a cable 185 that extends to the operator's station on the tractor, the rear end of the cable being connected to the upper end of the lever 176 and carrying forwardly thereof a knot or other abutment, as at 187, which lies in the slotted portion 188 of a loop 189 that is carried at the upper end of a standard 191 which is fixed to the forward portion of the cylinder-receiving bracket 85. By exerting a forward pull on the cable 185 the knot portion 187 may be brought through the larger portion of the loop 189 and into a position against the forward side of the slotted portion 188, thereby holding the rod-engaging pad 182 out of engagement with the rod 113, as shown in Figure 2. Therefore, as long as the lever 176 is held in a forward position, fore and aft movement of the rod 113 will successively advance the ratchet 116 and cam-supporting shaft 117, thereby reversing the raising mechanism latches as well as the hitch or draft device latches, but the cam mechanism may be disabled by the operator momentarily exerting a pull on the cable 185 to release the knot 187 and thereafter releasing the cable 185 to permit the spring 183 to raise the pad 182 and lift the rod 113 away from the ratchet wheel 115.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a two-way plow including frame means, a pair of alternately operable plow units movably connected therewith, a pair of spaced apart means movably mounted on said frame means and connected, respectively, with said plow units to move the latter, power means including a part shiftably mounted on said frame means to engage and shift both of said spaced apart means and thereby raise either or both of said plow units, and alternately operable means engageable between said shiftably mounted part and said spaced apart means for locking either of said plow units in its lowered position.

2. In a trailing two-way plow including ground-supported frame means, a pair of alternately operable plow units movably connected therewith, double-acting power means carried by said frame means and having a one-way connection with said plow units to raise either or both of said plow units into a transport position, selectively operable means for holding each of said plow units in its transport position, and alternately operable means acting between said power means and said plow units for locking one or the other of the latter in its lowered position, said alternately operable means including a pair of parts movably mounted on said frame means and connected, respectively, with said units and movable alternately in a position to connect the associated unit with said power means so as to lock said unit, when in its lowered position, to said power means, whereby the latter acts to hold the lowered unit against movement out of its lowered position.

3. In a two-way plow including frame means, a pair of alternately operable plow units movably connected therewith, a pair of pivotally interconnected links pivoted to said frame means and each of said plow units, means for raising either or both of said plow units, each of said pairs of links moving into an overcenter position when the associated plow unit is raised for holding the latter in its raised position, and means for alternately latching said links to said raising and lowering means, whereby the latter acts through said links for shifting the associated plow unit.

4. A two-way plow comprising frame means, a pair of plow units shiftable independently of each other relative to said frame means, a pair of toggle links connected between said frame means and each of said plow units, means for shifting said pairs of toggle links in one direction to raise the associated plow units, and means for latching certain of said toggle links to said shifting means whereby movement of the latter in the other direction acts to lower the associated plow unit.

5. An agricultural implement comprising frame means, tool means connected with said frame means for movement relative thereto between raised and lowered position, a pair of overcenter links pivotally connected to one another and to said tool means and frame means, power means movable optionally in opposite directions and adapted, when moved in one direction, to engage one of said overcenter links and act therethrough to raise said tool means, and means movable with said one link and optionally operable for locking said link to move with said power means whereby, when the latter is moved in the other direction, to move said one link in the other direction.

6. A two-way plow comprising frame means, a pair of alternately operable tool units shiftably connected with said frame means, a pair of overcenter means connected between said frame means and said tool units, respectively, and acting to lock said tool units in raised position, a power operated unit having a one-way connection with said tool units and shiftable in one direction to raise either or both of said tool units into their raising position, and controllable means operable by movement of said power unit in the other direction for releasnig one of said overcenter locking means.

7. An agricultural implement comprising frame means, tool means movable relative thereto and adapted to be raised and lowered, a pair of pivotally interconnected overcenter links pivotally connected with said frame means and tool means and adapted when swung into an overcenter position to hold said tool means raised, an operating means having a part engageable with one of said links for shifting the overcenter links into their extended position to raise said tool means, a latch carried by said one link and optionally engageable with said part whereby movement of the latter in the other direction releases said overcenter links and lowers said tool means, and means for controlling said latch.

8. For use in a two-way plow having frame means and a pair of plow units shiftably connected therewith, the improvement comprising a power operated member, means operated by movement of said member in one direction for raising either or both of said plow units, means for holding each of said plow units in a raised position, separate means, one associated with each of said holding means, adapted to be connected with said member to be actuated by movement thereof in the other direction for releasing one or the other of said holding means, and means for alternately connecting said releasing means with said power operated member.

9. For use in a two-way plow having frame means and a pair of plow units movably connected therewith, the improvement comprising two pairs of toggle links connected between said frame means and said plow units, means engageable with said toggle links for raising said plow units into inoperative position when said raising means is moved in one direction, said links moving into overcenter position when said plow units are raised and serving to lock said plow units in raised position, and controllable latch means acting against said toggle links and optionally engageable with said raising means for unlocking the associated toggle links to cause the associated plow unit to lower when said raising means is moved in the other direction.

10. For use in a two-way plow having frame means and a pair of alternately operable plow units swingably connected with said frame means, the improvement comprising a pair of raising connections acting between said frame means and said plow units, a part movable in one direction to actuate at least one of said connections and raise the associated plow unit, releasable means for holding either or both of said raising connections in raised position, and alternately operated means controlled by movement of said part in the other direction for releasing said releasable means.

11. For use with a tractor having a power operated double acting ram unit, a two-way plow including frame means, a rockshaft mounted on said frame means, a pair of laterally spaced arms on said rockshaft, a pair of plow units connected in side-by-side relation with said frame means and movable relative thereto independently of each other, two pairs of pivotally interconnected links connected, respectively, between said plow units and said frame means, the lower links of said pairs of links being positioned to be shifted in one direction by movement of said rockshaft arms in one direction, extension of said ram unit in one direction acting through said arms and links to raise either or both of said plow units and shift said links into overcenter position, and means for selectively connecting one or the other of the lower links with said rockshaft arms for causing actuation of said ram unit in the other direction to lower the plow unit connected with said one or said other of said links.

12. In a two-way plow, frame means, a pair of plow units independently movable relative to said frame means into and out of raised and lowered positions, a double acting power unit, a raising and lowering means connected with each of said plow units and positioned to be engaged and moved by said power unit when the latter is moved in one direction, a latch carried by each raising and lowering means and biased to lock the latter to said power unit whereby movement of the power unit in the other direction also shifts said raising and lowering means, a part carried by said frame means and shiftable into one position or another to hold one or the other of said latches out of power unit engaging position, and mechanism actuated by said power unit for shifting said latch controlling part from one position to another.

13. In a two-way plow, frame means, a pair of plow units independently movable relative to said frame means into and out of raised and lowered positions, a double acting power unit, a raising and lowering means connected with each of said plow units and positioned to be engaged and moved by said power unit when the latter is moved in one direction, a latch carried by each raising and lowering means and biased to lock the latter to said power unit whereby movement of the power unit in the other direction also shifts said raising and lowering means, a part carried by said frame means and shiftable into one position or another to hold one or the other of said latches out of power unit engaging position, cam means adapted to be advanced in step by step relation by successive operations of said power unit in one direction, and means connecting said cam means with said latch controlling part whereby the latter is shifted alternately into opposite positions by successive advances of said cam means.

14. For use in a two-way plow having frame means and a pair of alternately operative plow units swingably connected therewith, the improvement comprising a pair of toggle links extending between said frame means and each plow unit, a part adapted to be rockably mounted on said frame means and operative, when moved in one direction, to engage one link of either or both of said pairs of togggle links for raising the associated plow units and to shift the toggle links into an overcenter position, thus locking the plow unit or units in a raised position, said part being movable in the other direction freely away from said pairs of toggle links, a latch mounted on said one link of each of said pairs of toggle links and biased to move into a position to engage and lock said part to said one link, whereby when said part moves in said other direction said one link moves therewith and thereby causes the associated plow unit to lower, and means for alternately holding one or the other of said latches out of part-engaging position.

15. For use in a two-way plow having frame means and a pair of alternately operative plow units swingably connected therewith, the improvement comprising a pair of toggle links extending between said frame means and each plow unit, a part adapted to be rockably mounted on said frame means and to engage either or both of the lower links of said pairs of toggle links when moved in one direction for raising the associated plow units and to shift the toggle links into an overcenter position, thus locking the plow unit or units in a raised position, said part being movable in the other direction freely away from said pairs of toggle links, a latch mounted on each lower link of said pairs of toggle links and biased to move into a position to engage and lock said part to said lower link, whereby when said part moves in said other direction said lower link moves therewith and thereby causes the associated plow unit to lower, a member swingably mounted on said frame means and shiftable into alternate positions for holding one or the other of said latches out of part-engaging position, and means actuated by said rockably mounted part for alternating said member.

16. For use in a two-way plow having frame means and a pair of alternately operative plow units swingably connected therewith, the improvement comprising a pair of toggle links extending between said frame means and each plow unit, a part adapted to be rockably mounted on said frame means and to engage either or both of the lower links of said pairs of toggle links when moved in one direction for raising the associated plow units and to shift the toggle links into an overcenter position, thus locking the plow unit or units in a raised position, said part being movable in the other direction freely away from said pairs of toggle links, a latch mounted on each lower link of said pairs of toggle links and biased to move into a position to engage and lock said part to said lower link, whereby when said part moves in said other direction said lower link moves therewith and thereby causes the associated plow unit to lower, an abutment movably mounted on said frame means and shiftable from one position, in which said abutment engages one of said latches so as to prevent it from engaging said part, into another position, in which said abutment frees said one latch and holds said other latch out of engagement with said part, and means actuated by movement of said part for shifting said abutment.

17. In a plow having frame means and a plow unit movably connected therewith, the improvement comprising a pair of pivotally interconnected toggle links connected between said frame means and said plow unit, means having a one-way connection with one of said links for shifting both of said toggle links and acting therethrough to move said plow unit in one direction, said shifting means being movable away from said one link, and means carried by said one link and movable into two positions, said means in one position being optionally engageable with said link shifting means, whereby the latter acts through said links for causing said plow unit to be shifted in the other direction.

18. In a plow having frame means and a plow unit movably connected therewith, the improvement comprising a pair of pivotally interconnected toggle links connected between said frame means and said plow unit, a part rockably mounted on said frame means in a position and adapted when moved in one direction to engage one of said links in abutting relation for shifting said toggle links and moving said plow unit into a raised position, said part having a range of movement in said one direction such that said toggle links are moved thereby into an overcenter position, thereby serving to hold said plow unit in its raised position, said part being movable freely in the other direction away from said one link while said toggle links are retained in their overcenter position, and means carried by said one link and optionally engageable with said part for causing movement of the latter in said other direction to swing said toggle links and lower said plow unit.

19. A two-way plow adapted to be pulled by a tractor and raised and lowered by a double acting hydraulic ram unit deriving operating power from the tractor, said two way plow comprising frame means, right and left hand plow units movably connected with said frame means, a pair of toggle links connected between said frame means and each plow unit, each of said pairs of toggle links being adapted, when disposed in overcenter position, to hold the associated plow unit in its raised position, a rockable member mounted on the frame means and having a pair of operating arms arranged to engage a link of each of said pairs of toggle links for shifting either or both of said pairs of toggle links into overcenter position and thus raise either or both of said plow units, said rockable member being movable away from said toggle links when said ram unit is operated in the other direction, thus leaving the toggle links in their overcenter positions and thereby holding the plow units raised, and means for controllably connecting said toggle links to said parts whereby movement of said rockable member in said other direction acts through the toggle links and against said frame means and associated parts to hold the selected plow unit in a lowered position.

20. An agricultural implement comprising mobile frame means, a member rockable thereon, a double acting power unit carried by said frame means and connected to operate said rockable member, tool means connected with said frame means and movable relative thereto between raised and lowered positions, a pair of pivotally interconnected overcenter links connected to said frame means and said shiftable tool means, said rockable member including a part engageable with one of said overcenter links whereby operation of said power unit in one direction acts through said links to raise said tool means and move said links into an overcenter position for locking said tool means in a raised position, latch means on said one link optionally engageable with said part whereby movement of the latter in the other direction swings said links to lower said tool means, and means optionally operable for holding said latch means out of engagement with said part.

References Cited in the file of this patent

UNITED STATES PATENTS

| Number | Name | Date |
|---|---|---|
| 1,363,755 | Reynolds | Dec. 28, 1920 |
| 1,817,085 | Lindgren | Aug. 4, 1931 |
| 2,249,861 | Silver | July 22, 1941 |
| 2,332,741 | Mott | Oct. 26, 1943 |
| 2,334,455 | Thomas | Nov. 16, 1943 |
| 2,358,964 | Noffsinger | Sept. 26, 1944 |
| 2,383,689 | Silver | Aug. 28, 1945 |
| 2,395,322 | Evans | Feb. 19, 1946 |
| 2,437,879 | Ferguson | Mar. 16, 1948 |
| 2,457,163 | Lansing | Dec. 28, 1948 |
| 2,474,731 | Evans | June 28, 1949 |
| 2,575,428 | Rogers | Nov. 20, 1951 |

FOREIGN PATENTS

| Number | Country | Date |
|---|---|---|
| 691,630 | France | July 15, 1930 |
| 601 | Great Britain | of 1870 |
| 84,388 | Switzerland | Mar. 1, 1920 |
| 223,726 | Switzerland | Jan. 4, 1943 |